(12) United States Patent
Singh et al.

(10) Patent No.: US 10,462,754 B1
(45) Date of Patent: Oct. 29, 2019

(54) SYSTEMS AND METHODS FOR SELECTIVELY REDUCING AN ALLOWABLE TRANSMIT POWER OF A WIRELESS DEVICE

(71) Applicant: Sprint Spectrum LP, Overland Park, KS (US)

(72) Inventors: Jasinder P. Singh, Olathe, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/477,154

(22) Filed: Apr. 3, 2017

(51) Int. Cl.
*H04W 52/00* (2009.01)
*H04W 52/18* (2009.01)
*H04W 52/36* (2009.01)
*H04W 52/24* (2009.01)
*H04W 52/32* (2009.01)

(52) U.S. Cl.
CPC ....... *H04W 52/365* (2013.01); *H04W 52/241* (2013.01); *H04W 52/242* (2013.01); *H04W 52/322* (2013.01); *H04W 52/325* (2013.01); *H04W 52/327* (2013.01); *H04W 52/367* (2013.01)

(58) Field of Classification Search
CPC ............. H04W 52/365; H04W 52/367; H04W 52/322; H04W 52/327; H04W 52/325; H04W 52/241; H04W 52/242
See application file for complete search history.

(56) References Cited

U.S. PATENT DOCUMENTS

| | | | |
|---|---|---|---|
| 9,078,220 B2 | 7/2015 | Makhlouf et al. | |
| 2005/0277415 A1* | 12/2005 | Hamalainen | H04W 36/0094 455/436 |
| 2010/0151876 A1* | 6/2010 | Park | H04W 72/082 455/452.2 |
| 2010/0233962 A1* | 9/2010 | Johansson | H04W 52/343 455/63.1 |
| 2011/0021240 A1* | 1/2011 | Hiltunen | H04J 11/0086 455/522 |
| 2012/0213149 A1* | 8/2012 | Chakraborty | H04W 52/365 370/328 |
| 2015/0092670 A1* | 4/2015 | Makhlouf | H04W 52/265 370/329 |

OTHER PUBLICATIONS

3GPP ETSI ts_136101v090100p Oct. 2009 (Year: 2009).*

* cited by examiner

*Primary Examiner* — Dong-Chang Shiue

(57) ABSTRACT

Systems and methods are described for reducing a maximum allowable transmit power of a wireless device. Instructions to reduce a maximum transmit power of wireless devices operating at a carrier band edge of a band channel maybe received at an access node. Power headroom reports may be collected from the wireless devices. The wireless devices may be classified based on the collected power headroom reports. Power reduction may be imposed on wireless devices classified as low power wireless devices and wireless devices classified as high power wireless devices may be handed off to a neighboring band channel.

20 Claims, 7 Drawing Sheets

SYSTEMS AND METHODS FOR SELECTIVELY REDUCING AN ALLOWABLE TRANSMIT POWER OF A WIRELESS DEVICE

TECHNICAL BACKGROUND

Wireless networks may include multiple access nodes each radiating to define a coverage area in which wireless devices can operate and can function in accordance with a particular network architecture and/or protocol to facilitate communications to/from connected wireless devices. In addition, wireless networks may be operated by wireless network operators (or service providers), which network operators may coexist with others in a wireless marketplace. These network operators can be licensed by regulatory agencies to operate in distinct, non-overlapping regions, or "carrier bands," of a radio frequency (RF) spectrum. For example, in the United States, the Federal Communications Commission (FCC) holds regulatory authority over the RF spectrum. Regulatory agencies, such as the FCC, set requirements that specify allowable levels of power leakage (i.e., power-leakage mandates), but rarely prescribe how to meet (or achieve) the specified power leakage levels.

Wireless networks have developed procedures (and/or protocols) for meeting the power-leakage mandates. One approach, for example, attenuates (or reduces) uplink (UL) transmit power(s) of wireless devices operating within a coverage area of access node(s) of the wireless network and at edges of carrier bands of the RF spectrum. But, in wireless networks that co-deploy high power wireless devices and low power wireless devices (e.g., off-the-shelf and/or other legacy wireless devices already compliant with the power-leakage mandate), attenuation of the UL transmit power across of all connected wireless devices may reduce the UL transmit power low power wireless devices to a level lower than the power-leakage mandate. This is due, in part, to power headroom disparities between the high power and low power wireless devices.

Overview

Systems and methods are described for reducing an allowable transmit power of wireless devices operating in a wireless network. For example, instructions may be received at an access node to reduce an allowable transmit power of wireless devices operating at an edge of a first frequency band to a first level. The access node may collect power headroom reports from the wireless devices and, based on the collected power headroom reports, classify each wireless device as either a high power wireless device or low power wireless device (i.e., off-the-shelf and/or other legacy wireless devices). For wireless devices classified as high power wireless devices, the access node may impose power reduction.

Systems and methods are also described for selecting a wireless device for handover from one channel of an access node to another. For example, a power reduction indicator may be received at an access node for wireless devices operating on a first channel. Wireless devices may be selected for handover to a second channel based on a criteria. An allowable transmit power may be reduced for the unselected wireless devices.

In yet another embodiment, systems and methods are described for reducing an operating power of wireless devices in a wireless network. For example, a power class category of a first wireless device and a power class category of a second wireless device may be determined at an access node. The first wireless device may operate at an edge of a first channel of the access node. The wireless network may perform a handover of the first wireless device from the first channel to a neighboring channel and reduce an operating power of the second wireless device.

DETAILED DESCRIPTION

Figure 1A:
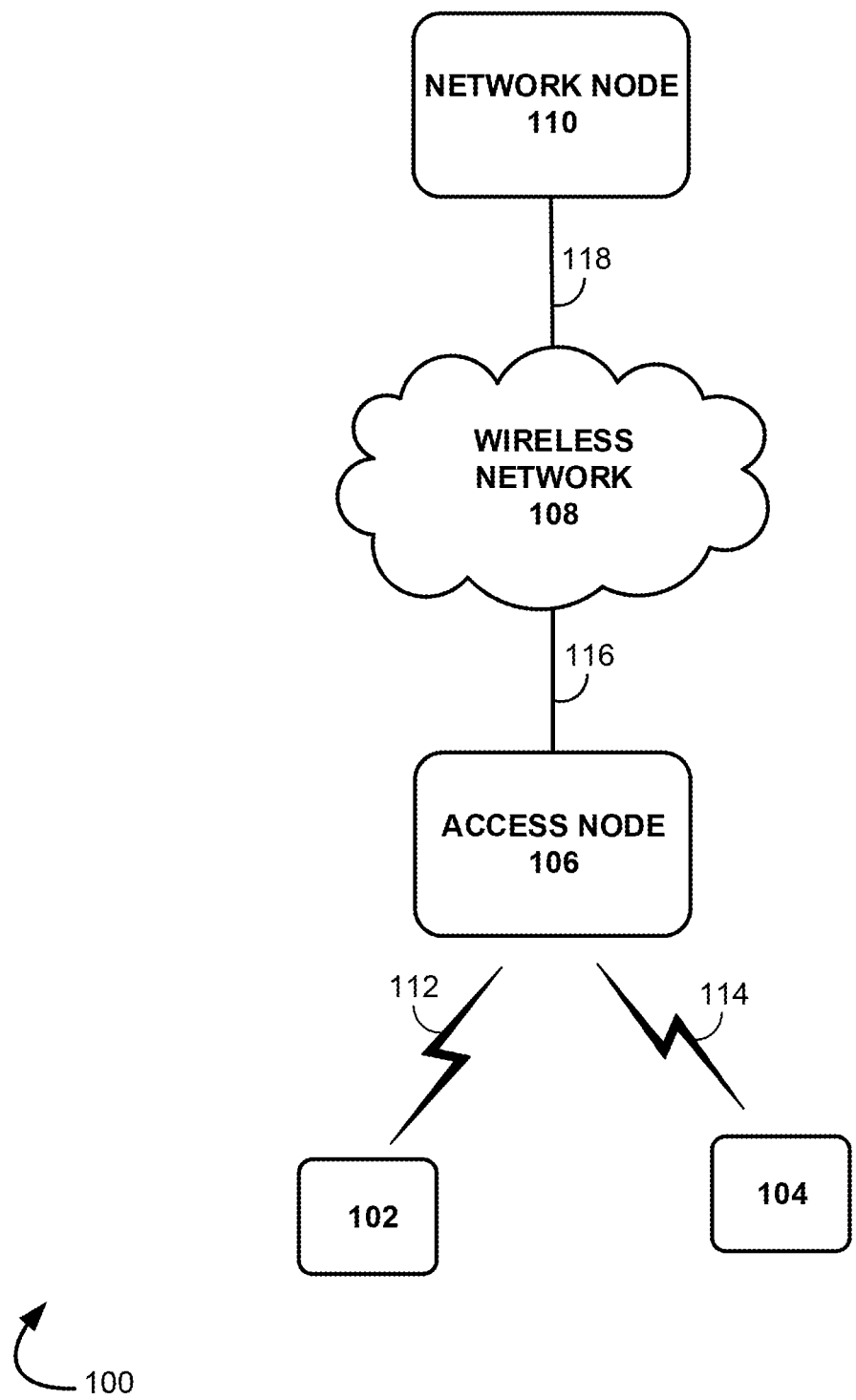
FIG. 1A illustrates an exemplary communication system for reducing an allowable transmit power of wireless devices operating in a wireless network.

Wireless networks may be operated by wireless network operators (or service provider); multiple wireless network operators may coexist in a wireless marketplace, offering various services to subscribed wireless devices. Each network operator may be licensed by a regulatory agency (such as the FCC) to operate in one or more distinct, non-overlapping regions, or "carrier bands," of the radio frequency (RF) spectrum. One concern related to creation of distinct, non-overlapping regions of RF spectrum is RF emission "leaking" from one carrier band into other adjacent or nearby carrier bands. To counteract RF emission leaking, regulatory agencies set requirements that specify allowable power leakage levels (i.e., power-leakage mandates), but rarely prescribe how to meet the specified power leakage levels.

One approach, implemented by wireless networks, to control cross-carrier power leakage includes use of operational protocol(s) to attenuate (or reduce) uplink (UL) transmit power(s) of wireless devices operating within a coverage area of access node(s) of the wireless network and, for example, at edges of the carrier bands of the RF spectrum and/or those wireless devices at risk for causing excessive cross-carrier power leakage. More particularly, wireless network operators ensure compliance of subscriber wireless devices with the power-leakage mandates through imposition of attenuation protocols on wireless devices reporting a transmit power above a threshold transmit power level. Often, because wireless network operators cannot verify that roaming wireless devices (i.e., wireless devices subscribed to a different network operator) operating within a coverage area of access node(s) of the wireless service provider are similarly compliant with the power-leakage mandates, wireless network operators broadcast signaling messages to every wireless device (i.e., subscribed and un-subscribed wireless devices) connected to an access node to apply a certain amount of attenuation (or power reduction) to a current transmit power. In the alternative, to ensure compliance with the power-leakage mandates, a particular wireless network operator may instruct all connected wireless devices of the wireless network to automatically attenuate (or reduce) its power level to a preset level (i.e., set based on the power-leakage mandates) to avoid a need to certify compliance with the power-leakage mandates.

While these approaches avoid and/or minimize cross-carrier power leakage, broadcast of signaling messages, which instruct all wireless devices to attenuate (or reduce) an UL transmit power, may reduce the UL transmit power of some wireless devices to a level lower than the power-leakage mandate. For example, in an effort to boost coverage and enhance throughput of wireless networks, wireless network operators have proposed co-deployment of high power wireless devices (e.g., power class 1 or 2 devices, illustrated in Table 1 below) alongside low power wireless devices (e.g., off-the-shelf and/or other legacy wireless devices already compliant with the power-leakage mandates, classified as power class 3 or 4 wireless devices, illustrated in Table 1 below) throughout the wireless network. Due to disparities in the reported power headroom of high power wireless devices and low power wireless devices, broadcast signaling messages that instruct uniform application of attenuation (or reduction) to a current transmit power of wireless devices connected to an access node(s) of the wireless network reduces the transmit power of low power wireless devices to a level lower than the power-leakage mandate. That is, application of a set amount of attenuation (or reduction) to a current transmit power reduces the transmit power of wireless devices that are already compliant with the power-leakage mandate at, for example, the carrier band edge to a level lower than the power-leakage mandate.

Figure 1B:
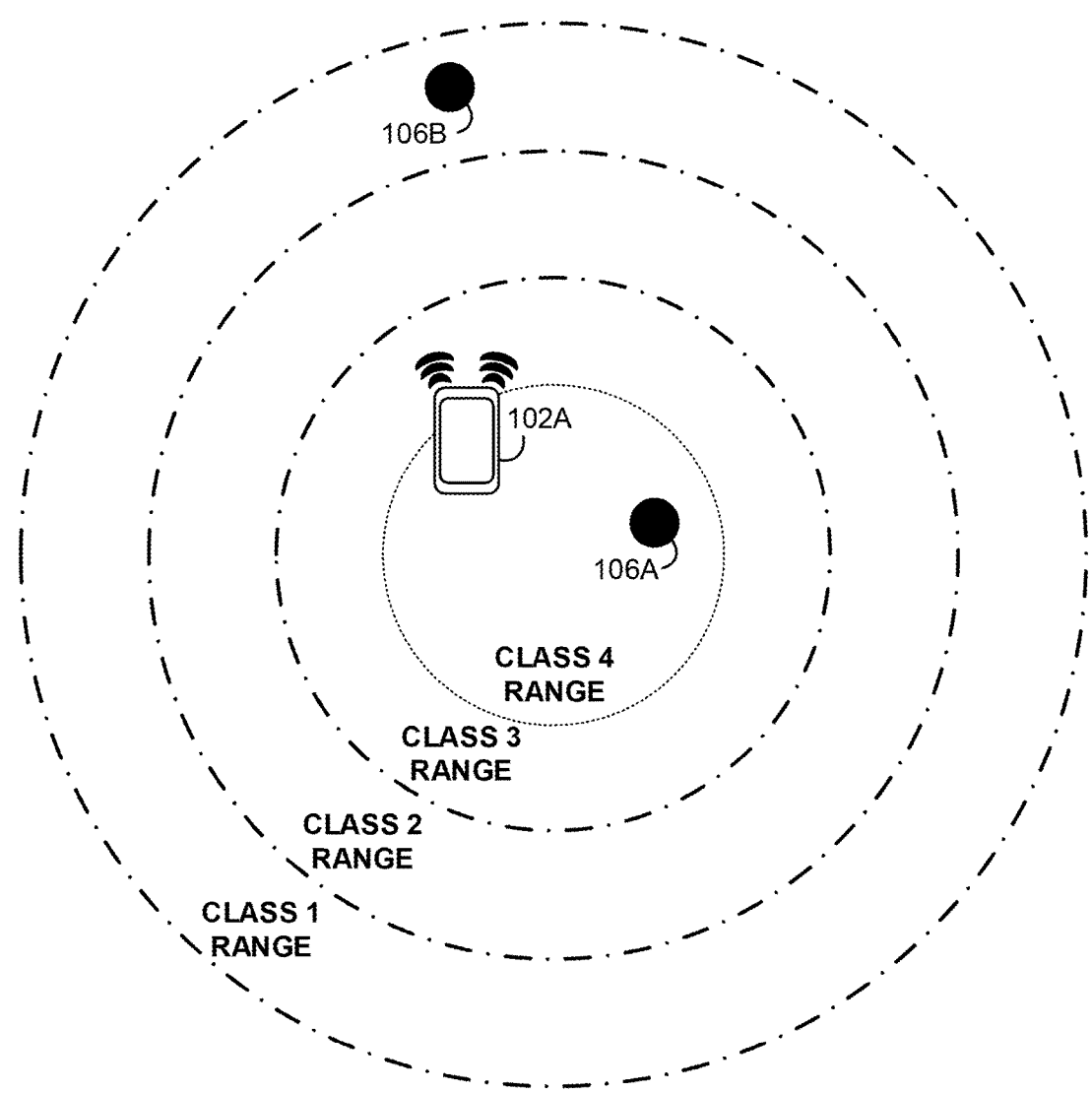
FIG. 1B illustrates exemplary power class range(s) of high power wireless devices and low power wireless devices of the exemplary communication system illustrated in FIG. 1A.
Figure 1C:
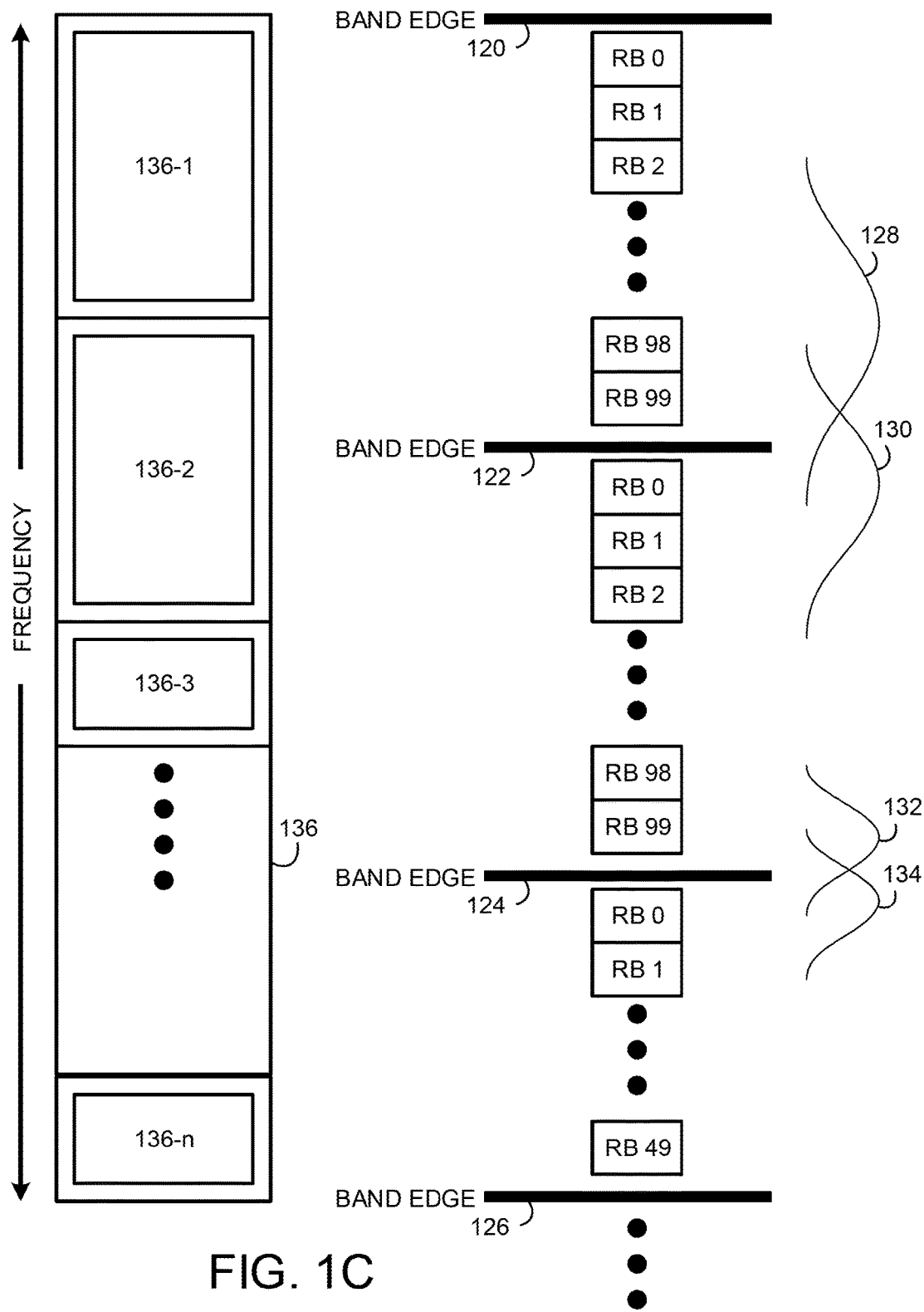
FIG. 1C illustrates carrier bands of a band channel of the exemplary communication systems illustrated in FIG. 1A.

FIG. 1A illustrates an exemplary communication system 100 for reducing an allowable UL transmit power of wireless devices operating in a wireless communication network. FIG. 1B illustrates exemplary power class range(s) of high power and low power wireless devices of the exemplary communication system 100 illustrated in FIG. 1A. FIG. 1C illustrates carrier bands of a RF spectrum (or band channel) of the exemplary communication system 100 illustrated in FIG. 1A. System 100 can comprise high power and/or low power wireless devices 102, 102A, 104, access nodes 106, 106A, 106B, network node 110, and wireless network 108. Access nodes 106, 106A, 106B can further include a data scheduler (not shown). The communications between high power and/or low power wireless devices 102, 102A, 104 can be relayed, monitored, inspected, and/or scheduled by an inspection module or node (not shown) at access nodes 106, 106A, 106B.

Other network elements may be present in the communication system 100 to facilitate communication but are omitted for clarity, such as controller nodes, base stations, base station controllers, gateways, mobile switching centers (MSC), dispatch application processors (DAP), and location registers such as a home location register (HLR) or visitor location register (VLR). Furthermore, other network elements may be present to facilitate communication between high power and low power wireless devices 102, 102A, 104, access nodes 106, 106A, 106B, wireless network 108, and network node 110, which are omitted for clarity, including additional processing nodes, routers, gateways, and physical and/or wireless data links for carrying data among the various network elements.

As noted above, wireless devices 102, 102A, 104 can be configured as different power class wireless devices (e.g., high power and/or low power wireless devices) and can be any device configured to communicate over system 100 using a wireless communication link or interface. In one embodiment, illustrated in Table 1 below, the maximum allowable transmit power for wireless devices 102, 102A, 104 can be defined by the power class of the wireless device. For example, the maximum allowable transmit power level and tolerance (i.e., power error limits associated with a particular power class) with which wireless devices 102, 102A, 104 can transmit data on a given operating or carrier band (e.g., Bands I-III) of a RF spectrum (or band channel) can be specified based on a pre-defined power class (e.g., power classes 1-4, illustrated in Table 1 below and FIG. 1B) of the wireless device 102, 102A, 104 rather than a physical maximum transmit capability of the wireless device 102, 102A, 104 hardware.

In one embodiment, high power and/or low power wireless devices can be implemented using Third Generation Partnership Project Long Term Evolution (3GPP LTE) network architecture and/or protocol. For example, low power class wireless devices (e.g., off-the-shelf and/or other legacy wireless devices already compliant with the power-leakage mandates) are currently defined in LTE as power class 3 and/or power class 4 wireless devices. Power class 3 and/or power class 4 wireless devices can be configured (in LTE) with a maximum allowable transmit power level of +23 dBm for network operating (or carrier) Bands I-III with a nominal power tolerance of ±2 dB (e.g., for E-UTRA bands), as illustrated in Table 1. High power class wireless devices are currently defined in LTE as power class 1 and/or power class 2 wireless devices. Power class 1 and/or power class 2 wireless devices can be configured (in LTE) with a maximum allowable transmit power of +26 dBm for network operating (or carrier) Bands I-II with a nominal power tolerance ±2 dB (e.g., for E-UTRA bands), as illustrated in Table 1. But, one of ordinary skill in the art would recognize that high power and/or low power wireless devices are not limited to any specific technology architecture, such as LTE, and can be used with any network architecture and/or protocol.

TABLE 1

| Operating Band | Power Class 1 Wireless Device | | Power Class 2 Wireless Device | | Power Class 3 Wireless Device | | Power Class 4 Wireless Device | |
|---|---|---|---|---|---|---|---|---|
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

Under the LTE network architecture and/or protocol, downlink (DL) and uplink (UL) resources are mapped in the time/frequency domain. In the time domain, the air interface may be divided into a continuum of 10 millisecond (ms)

frames, with each frame being further divided into ten 1-ms subframes that are in turn each divided into two 0.5-ms time slots. Thus, each frame has 10 subframes and each subframe has two slots; the 1-ms duration of a subframe also defines a transmission time interval (TTI). Slots are further subdivided into a number (typically 7) of modulation intervals (i.e., symbol times). In the frequency domain, data for transmission during each symbol time are jointly modulated over a sequence of sub-carriers that span the bandwidth of the carrier using Orthogonal Frequency Division Multiplexing (OFDM) to form one OFDM symbol per symbol time. Each OFDM symbol corresponds to a frequency superposition of modulated data symbols, which are further organized in frequency into groups, each group spanning 12 contiguous sub-carriers. Each sub-carrier may be 15 kHz wide such that each group of 12 sub-carriers occupies a 180 kHz bandwidth.

Within the RF spectrum (or band channel), different network operators are allocated different, non-overlapping carrier bands (e.g., 1.4 MHz, 3 MHz, 5 MHz, 10 MHz, 15 MHz, and/or 20 MHz) used to provide wireless services. In some instances, network operators may be allocated more than one carrier band. These carrier bands are organized in frequency within "band channels" used to sub-divide the RF spectrum at a higher level than individual carriers; each carrier band of a given band channel can be separated by a common band edge. For example, referring to FIG. 1C, a band channel 136 may span frequencies 2,496 MHz to 2,690 MHz. Within the band channel 136, four carrier bands 136-1, 136-2, 136-3, 136-*n* are shown. To a right side of FIG. 1C, an expanded view of the first three carrier bands 136-1, 136-2, 136-3 depicting representative resource blocks in each carrier and band edges 120, 122, 124, 126 are shown. For example, band edge 120 marks a minimum frequency of the carrier 136-1, which acts as a lower-frequency boundary of band channel 136; band edge 122 marks a common boundary between the maximum frequency of carrier band 136-1 and a minimum frequency of carrier band 136-2; band edge 124 marks a common boundary between the maximum frequency of carrier band 136-2 and the minimum frequency of carrier band 136-3; and, band edge 126 marks a common boundary between the maximum frequency of carrier band 136-3 and the minimum frequency of the next (unspecified) carrier band. In FIG. 1C, carrier bands 136-1 and 136-2 are each illustrated as having a bandwidth of 20 MHz (e.g., signified by the 100 resource blocks numbered RB0, RB1, RB2, . . . , RB98, RB99, etc.) while carrier band 136-3 is illustrated as having a bandwidth of 10 MHz (e.g., signified by the 50 resource blocks numbered RB0, RB1, . . . , RB49). Cross-carrier power leakage (i.e., RF emission leakage) between carrier bands is represented to the right of the displayed resource blocks by graphical plots of power as a function of frequency. For example, a power plot 128 represents a transmit power originating in sub-carrier(s) of carrier band 136-1 and a power plot 130 represents a transmit power originating in subcarrier(s) of carrier band 136-2. Cross-carrier power leakage occurs in the region where the plots overlap. Similarly, cross-carrier power leakage is illustrated with partially overlapping power plots 132, 134 near the band edge 124 between carrier band 136-2 and carrier band 136-3. That is, in the overlap region of the power plots 132, 134, at least some power originating in carrier band 136-2 near band edge 124 originates from sub-carriers in carrier band 136-3; and in the overlap region, at least some of the power in carrier band 136-3 near the band edge 124 originates from sub-carriers in carrier band 136-2. As noted above, to control the cross-carrier power leakage, wireless network 108 may instruct access nodes 106, 106A, 106B to implement attenuation (or reduction) protocols to attenuate (or reduce) a maximum transmit power of wireless devices 102, 102A, 104 operating at carrier band edges.

Wireless devices 102, 102A, 104 (e.g., configured as either high power and/or low power wireless devices) can include a cell phone, a smart phone, a computing platform such as a laptop, a palmtop, or a tablet, a personal digital assistant (PDA), an internet access device, and combinations thereof. Wireless devices 102, 102A, 104 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Access nodes 106, 106A, 106B can be any network node configured to provide communication between wireless devices 102, 102A, 104 and wireless network 108. Access nodes 106, 106A, 106B can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes 106, 106A, 106B can use data scheduler(s) and/or coordinate with a scheduler node (not shown) to communicate scheduling decisions (e.g., UL/DL scheduling assignments) to wireless devices 102, 102A, 104 using control information carried by an UL/DL control channel. Access nodes 106, 106A, 106B can collect and store maximum allowable transmit power (e.g., associated with a defined power class of wireless device 102, 102A, 104) and/or data related to capacity/delay characteristics (e.g., an amount of data buffered per wireless device, a RF signal quality of the wireless device, buffer delay or period of time from receipt of a last data packet at the wireless device, access node sector throughput, cell-edge wireless device user experience, guaranteed bit rate/non-guaranteed bit rate, backhaul limitations/capacity, wireless device mobility, etc.) of wireless devices 102, 102A, 104 reported (or collected) at access node 106, 106A, 106B.

Access nodes 106, 106A, 106B can comprise a processor and associated circuitry to execute or direct the execution of computer-readable instructions to obtain information. Access nodes 106, 106A, 106B can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 106, 106A, 106B can receive instructions and other input at a user interface.

Wireless network 108 can be a wired and/or wireless communication network, and can comprise processing nodes, routers, gateways, and physical and/or wireless data links for carrying data among various network elements, including combinations thereof, and can include a local area network (LAN), a wide area network (WAN), and an internetwork (including the Internet). Wireless network 108 can be capable of carrying data, for example, to support voice, push-to-talk, broadcast video, and data communications by a wireless device, for example, wireless devices 102, 102A, 104. Wireless network protocols can comprise Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by wireless network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Wireless network 108 can also comprise additional base stations, controller nodes, telephony switches, internet routers, network gateways, computer systems, communication links, or some other type of communication equipment, and combinations thereof.

Network node 110 can be any network node configured to communicate information and/or control information over system 100. For example, network node 110 can receive and/or transmit information to/from wireless devices 102, 102A, 104 over system 100. While network node 110 is shown in the backhaul of system 100, network node 110 could alternatively be located between access nodes 106, 106A, 106B and wireless network 108. Network node 110 can be a standalone computing device, computing system, or network component, and can be accessible, for example, by a wired or wireless connection, or through an indirect connection such as through a computer network or wireless network. For example, network node 110 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 110 is not limited to any specific technology architecture, such as LTE, and can be used with any network architecture and/or protocol.

Communication links 112, 114, 116, 118 can be wired or wireless and use various communication protocols such as Internet, Internet Protocol (IP), LAN optical networking, Hybrid Fiber Coax (HFC), telephony, T1, or some other communication format—including combinations, improvements, or variations thereof. Wireless communication links 112, 114, 116, 118 can be a radio frequency, microwave, infrared, or other similar signal, and can use a suitable communication protocol, for example, GSM, CDMA, WiMAX, LTE, or combinations thereof. Other wireless protocols can also be used. Links 112, 114, 116, 118 can be a direct link or might include various equipment, intermediate components, systems, and networks.

Figure 2:
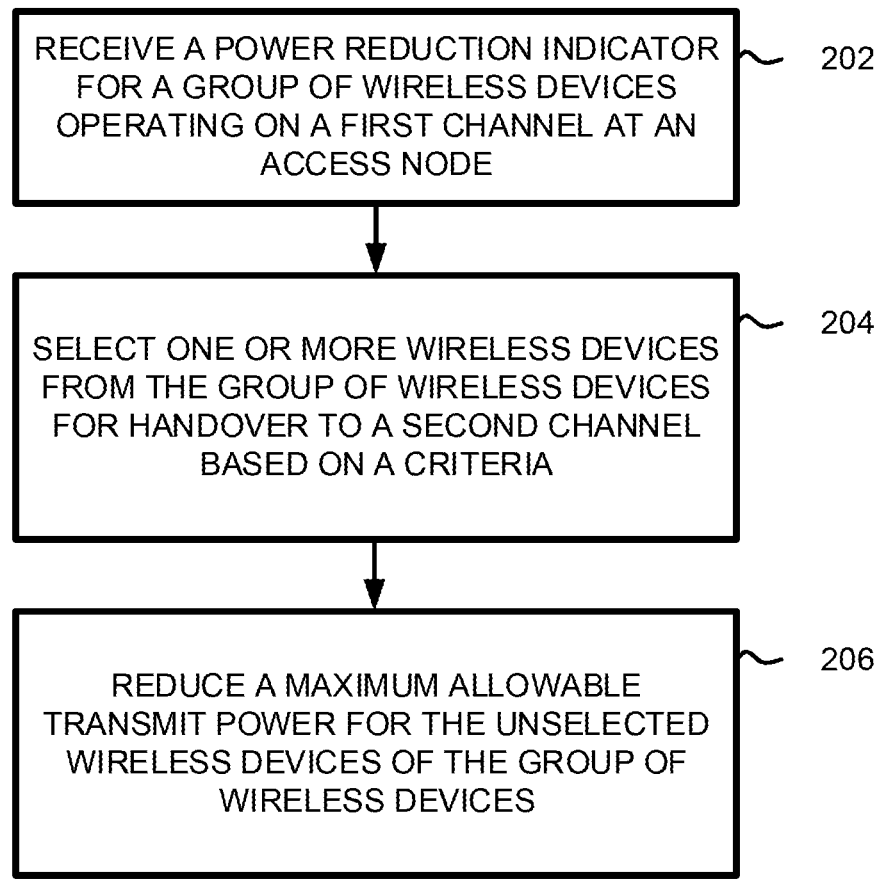
FIG. 2 illustrates an exemplary method for reducing an allowable transmit power of wireless devices operating in a wireless network.

FIG. 2 illustrates an exemplary method for reducing an allowable transmit power of wireless devices operating in a wireless communication network. The method of FIG. 2 will be discussed with reference to the exemplary system 100 illustrated in FIG. 1A, the exemplary power class range(s) of co-deployed high power wireless devices and low power wireless devices of the exemplary communication system 100 illustrated in FIG. 1B, and the exemplary carrier bands of the band channel of the exemplary communication system 100 illustrated in FIG. 1C. But, the exemplary method for reducing an allowable transmit power of wireless devices illustrated in FIG. 2 can be implemented with any suitable communication system. In addition, although FIG. 2 depicts steps performed in a particular order or arrangement. One skilled in the art, using the disclosure provided herein, will appreciate that various steps of the method can be omitted, rearranged, combined, and/or adapted in various ways.

Wireless devices 102, 102A, 104 can be configured as high power wireless devices 102, 102A and/or low power wireless devices 104 and co-deployed alongside each other throughout wireless network 108. Wireless devices 102, 102A, 104 can use power headroom (PHR) and/or enhanced PHR (ePHR) message(s) to report a current transmit power state (i.e., an amount of power the wireless device required in a previous subframe structure) at access node(s) 106, 106A, 106B; PHR and/or ePHR reporting at access node(s) 106, 106A, 106B can be periodic or event-triggered.

In some instances, regulatory agencies, such as the FCC, may set requirements that specify allowable levels of power leakage (i.e., power-leakage mandates). In one approach, wireless network 108 may impose uniform (or indiscriminate) attenuation (or reduction) of an UL transmit power for all wireless devices 102, 102A, 104 operating at carrier band edges on specified band channels (e.g., illustrated in FIG. 1C) to avoid cross-carrier power leakage from one carrier band into other adjacent or nearby carrier bands. For wireless networks 108 that co-deploy high power wireless devices alongside low power wireless devices (e.g., off-the-shelf and/or other legacy wireless devices already compliant with power-leakage mandates), indiscriminate application of attenuation (or reduction) protocols across all wireless devices 102, 102A, 104 may undesirably limit the UL transmit power of low power wireless devices to a level lower than the power-leakage mandates require.

In one embodiment, when instructed to attenuate (or reduce) an UL transmit power for all wireless devices 102, 102A, 104 operating at carrier band edges on specified band channels, wireless network 108 via access node(s) 106, 106A, 106B can selectively determine whether or not to apply the attenuation protocol to specific wireless devices 102, 102A, 104 operating within a coverage area of access node(s) 106, 106A, 106B based on a classification (or grouping) of the wireless device.

For example, referring to FIG. 2, at 202, wireless devices 102, 102A, 104 can use periodic and/or event-triggered PHR and/or ePHR messaging to report a current transmit power state or power headroom at access node 106, 106A, 106B. The current transmit power state or power headroom can be calculated as follows:

$$PH_i = P_{cMAX} - \{10 \log_{10}(M_{PUSCH}(i)) + P_{o\_PUSCH}(j) + \alpha(j) \cdot PL + \Delta_{TF}(i) + f(i)\}[\text{dBm}],$$

where $P_{cmax}$ is the maximum allowable transmit power of wireless device 102, 102A, 104, $M_{PUSCH}(i)$ is the number of wireless resources (e.g., the next available physical resource block, wireless spectrum, etc.) allocated to wireless device 102, 102A, 104, $P_{o\_PUSCH}(j)$ is a target received power, $\alpha(j)$ is a pathloss compensation factor, and PL is a calculated pathloss between wireless device 102, 102A, 104 and access node 106, 106A, 106B. $\Delta_{TF}(i)$ and $f(i)$ are parameters used to calculate an offset associated with a transport format and a power control adjustment, respectively.

Based on the current transmit power state or power headroom reported at access node 106, 106A, 106B (e.g., using PHR and/or ePHR messaging), access node 106, 106A, 106B can classify (or group) wireless devices 102, 102A, 104 as high power wireless devices or low power wireless devices. For example, those wireless devices 102, 102A reporting a greater current transmit power state or power headroom than other wireless devices 104 operating within the coverage area of the access node 106, 106A, 106B may be classified (or grouped) as a high power wireless device 102, 102A. Wireless devices 102, 102A, 104 may be further classified (or grouped) based on a reported (or detected) altitude above a threshold.

When, for example, a network operator instructs wireless network 108 to control cross-carrier power leakage by attenuating (or reducing) an UL transmit power of wireless devices 102, 102A, 104 operating within a coverage area of access node 106, 106A, 106B and at a carrier band edge of a band channel, access node 106, 106A, 106B can classify (or group) wireless devices 102, 102A, 104 based on the current transmit power state or power headroom collected at access node 106, 106A, 106B (i.e., the power class of the wireless device) and/or the reported (or detected) altitude. For example, in one embodiment, wireless devices 102, 102A may report an UL transmit power of +26 dBm (e.g., power class 1 or 2 wireless devices, illustrated in Table 1) and wireless device 104 may report an UL transmit power of +21 dBm (e.g., power class 3 or 4 wireless devices, illustrated in Table 1). Based on the reported UL transmit power, wireless devices 102, 102A may be classified (or grouped) as high power wireless devices and wireless device 104 may be classified (or grouped) as a low power wireless device. In addition, as noted above, high power wireless devices 102, 102A and/or low power wireless device 104 may be further classified (or grouped) based on a reported (or detected) altitude.

At 204, wireless network 108 via access node(s) 106, 106A, 106B selects wireless device(s) from the classified (or grouped) wireless devices 102, 102A, 104 for handover from the first band channel to a second band channel based on a criteria. For example, access node 106, 106A, 106B may choose (or select) to attenuate (or reduce) an UL transmit power of wireless devices 102, 102A, 104 based on the classification (or grouping) of the wireless devices 102, 102A, 104 as high power wireless devices or low power wireless devices (e.g., off-the-shelf and/or other legacy wireless device already compliant with the power-leakage mandate). For wireless devices classified as a low power wireless devices 104, access node 106, 106A, 106B may force a handover of low power wireless device 104 from a first band channel (e.g., a band channel that requires application of an attenuation protocol) to a second band channel (e.g., a band channel that does not require application of an attenuation protocol and/or a band channel that does not co-deploy high power wireless devices and low power wireless devices) such that an UL transmit power of low power wireless device 104 is not undesirably limited to a level lower than the power-leakage mandates require.

Alternatively or in addition to, access node 106, 106A, 106B may force a handover of high power wireless devices 102, 102A from the first band channel to the second band channel when high power wireless devices 102, 102A report (or access node 106, 106A, 106B detects) an associated altitude of the high power wireless device 102, 102A that meets or exceeds a threshold altitude level (e.g., a wireless device configured as a relay node on a light pole and/or a wireless device that includes a directional antenna used to avoid transmitting at a high UL transmit power toward the ground level where cross-carrier power leakage is a concern may be located at an altitude that exceeds the threshold altitude level). Access node 106, 106A, 106B may instruct those wireless devices classified (or grouped) as high power wireless devices 102, 102A operating at a band edge of the first band channel, which wireless devices 102A are not located at a high altitude, to attenuate (or reduce) an UL transmit power to a level in compliance with the power-leakage mandates.

At 206, the access node attenuates (or reduces) an UL transmit power for unselected wireless devices. For example, for those wireless devices operating at a band edge of the first band channel that do not meet the selection criteria for handover to the second band channel (e.g., those wireless devices that are not classified or grouped as low power wireless devices and/or high power wireless devices located at an altitude above a threshold), access node 106, 106A, 106B may implement the attenuation protocol. That is, access node 106, 106A, 106B may attenuate (or reduce) the UL transmit power of wireless device 102A from, for example, +26 dBm to +21 dBm such that the UL transmit power of wireless device 102A complies with the power-leakage mandates set by, for example, the FCC.

Figure 3:
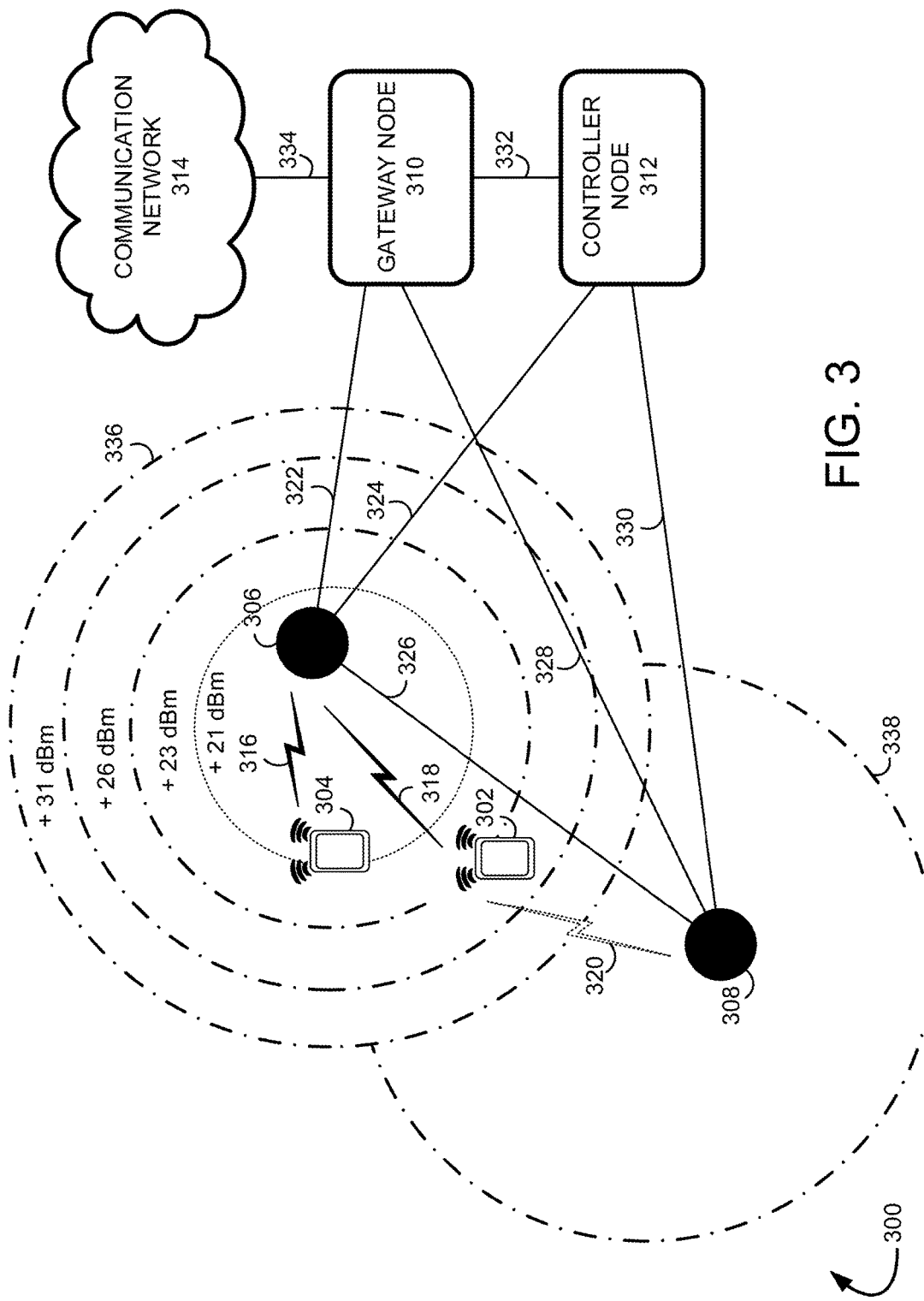
FIG. 3 illustrates another exemplary communication system for reducing an allowable transmit power of wireless devices operating in a wireless network.

FIG. 3 illustrates another exemplary communication system 300 for reducing an allowable transmit power of wireless devices operating in a communication network. The system 300 will be discussed with reference to the exemplary power class range(s) of co-deployed high power wireless devices and low power wireless devices illustrated in FIG. 1B and the exemplary carrier bands of the band channel illustrated in FIG. 1C. System 300 can comprise high power wireless devices and/or low power wireless devices 302, 304, access nodes 306, 308 (which can include data schedulers), gateway node 310, controller node 312, and wireless networks 314. A scheduler node (not shown) can be included in the backhaul of system 300. The communications between high power wireless devices or low power wireless devices can be relayed, monitored, inspected, and/or scheduled by an inspection module or node (not shown) at access nodes 306, 308 and/or a data scheduler or scheduler node (not shown).

Other network elements may be present in the communication system 300 to facilitate communication but are omitted for clarity, such as controller nodes, base stations, base station controllers, gateways, MSC, DAP, and location registers such as a HLR or VLR. Furthermore, other network elements may be present to facilitate communication between high power wireless devices and/or low power wireless devices 302, 304, access nodes 306, 308, etc., and wireless network 314.

As noted above, wireless devices 302, 304 can be configured as different power class wireless devices (e.g., high power wireless devices and/or low power wireless devices) and can be any device configured to communicate over system 300 using a wireless communication link or interface. In one embodiment, illustrated in Table 1, the maximum allowable transmit power for wireless devices 302, 304 can be defined by the power class of the wireless device. For example, the maximum allowable transmit power level and tolerance (i.e., power error limits) with which wireless device 302, 304 can transmit data on a given operating band (e.g., Bands I-III) can be specified based on a pre-defined power class (e.g., power classes 1-4 illustrated in Table 1 and/or FIG. 1B) of the wireless device 302, 304 rather than a physical maximum transmit capability of the wireless device 302, 304 hardware. Low power wireless devices are currently defined as power class 3 and/or power class 4 wireless devices with a maximum allowable transmit power level of +23 dBm for network operating (or carrier) Bands I-III; high power class wireless devices are currently defined as power class 1 or power class 2 wireless devices with a maximum allowable transmit power level of +26 dBm for network operating (or carrier) Bands I-III, as illustrated in Table 1.

Wireless devices 302, 304 (e.g., configured as either high power wireless devices or low power wireless devices) can include a cell phone, a smart phone, a computing platform such as a laptop, a palmtop, or a tablet, a PDA, an internet access device, and combinations thereof. A wireless interface of wireless devices 302, 304 can include one or more transceivers for transmitting and receiving data over system 300. Each transceiver can be associated with the same or different frequency bands, the same or different radio access technologies, the same or different network providers (or network operators), and/or the same or different services. For example, wireless devices 302, 304 can include a transceiver that is associated with one or more of the following: CDMA, GSM, WiMAX, 3GPP LTE, and/or HSPA, IEEE 802.11, WiFi, Bluetooth, Zigbee, IrDA, MBMS, etc.

Wireless devices 302, 304 can transmit and/or receive information over system 300 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, etc.

Wireless devices 302, 304 can be connected with access nodes 306, 308 through communication links 316, 318, 320. Links 316, 318, 320 can use various communication media, such as air, space, metal, optical fiber, or some other signal propagation path—including combinations thereof. Links 316, 318, 320 may comprise many different signals sharing the same link. Links 316, 318, 320 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302, 304 and access nodes 306, 308 could share the same representative wireless link, but be transferred over different communication sessions, frequencies, timeslots, packets, ports, sockets, logical transport links, or in different directions—including combinations thereof.

Access nodes 306, 308 can be any network node configured to provide communication between wireless devices 302, 304 and wireless network 314. Access nodes 306, 308 can be short range access nodes or standard access nodes. A short range access node could include a microcell base station, a picocell base station, a femtocell base station, relay node, or the like. A standard access node could include base transceiver stations, radio base stations, radio network controllers, an eNodeB device, or an enhanced eNodeB device, a donor eNodeB, or the like. Access nodes 306, 308 can use data scheduler(s) and/or coordinate with a scheduler node (not shown) to communicate scheduling decisions (e.g., UL/DL scheduling assignments) to wireless devices 302, 304 using control information carried by an UL/DL control channel.

Access nodes 306, 308 can comprise a processor and associated circuitry to execute or direct the execution of computer-readable instructions to obtain information. Access nodes 306, 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 306, 308 can receive instructions and other input at a user interface.

Gateway node 310 can be any network node configured to interface with other network nodes using various protocols. Gateway node 310 can communicate user data over system 300. Gateway node 310 can be a standalone computing device, computing system, or network component, and can be accessible, for example, by a wired or wireless connection, or through an indirect connection such as through a computer network or communication network. For example, gateway node 310 can include a Serving Gateway (SGW) and/or a Packet Data Network Gateway (PGW), etc. One of ordinary skill in the art would recognize that gateway node 310 is not limited to any specific technology architecture, such as LTE, and can be used with any network architecture and/or protocol. Moreover, while one gateway node 310 is illustrated in FIG. 3 as being in communication with wireless network 314, one of ordinary skill in the art would recognize that multiple gateway nodes could be in communication with wireless network 314.

Gateway node 310 can comprise a processor and associated circuitry to execute or direct the execution of computer-readable instructions to obtain information. Gateway node 310 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 310 can receive instructions and other input at a user interface.

Controller node 312 can be any network node configured to communicate information and/or control information over system 300. Controller node 312 can be configured to transmit control information associated with a handover procedure. Controller node 312 can be a standalone computing device, computing system, or network component, and can be accessible, for example, by a wired or wireless connection, or through an indirect connection such as through a computer network or communication network. For example, controller node 312 can include a MME, a HSS, a PCRF, an AAA node, a RMS, a SPS, a policy server, etc. One of ordinary skill in the art would recognize that controller node 312 is not limited to any specific technology architecture, such as LTE and can be used with any network architecture and/or protocol. Moreover, while one controller node is illustrated in FIG. 3 as being in communication with wireless network 314, one of ordinary skill in the art would recognize that multiple controller nodes could be in communication with wireless network 314.

Controller node 312 can comprise a processor and associated circuitry to execute or direct the execution of computer-readable instructions to obtain information. Controller node 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 312 can receive instructions and other input at a user interface.

Access node 306 can be in communication with gateway node 310 through communication link 322 and with controller node 312 through communication link 324. Access node 306 can be in communication with access node 308 through communication link 326. Access node 308 can be in communication with gateway node 310 through communication link 328 and with controller node 312 through communication link 330. Gateway node 310 can be in communication with controller node 312 through communication link 332 and with wireless network 314 through communication link 334. The communication links can be wired or wireless links and use various communication protocols such as Internet, IP, LAN, optical networking, HFC, telephony, T1, or some other communication format—including combinations, improvements, or variations thereof. The links can be a radio frequency, microwave, infrared, or other similar signal, and can use a suitable communication protocol, for example, GSM, CDMA, WiMAX, or LTE, or combinations thereof. Other wireless protocols can also be used. The links can be a direct link or might include various equipment, intermediate components, systems, and networks.

Wireless network 314 can be a wired and/or wireless communication network, and can comprise processing nodes, routers, gateways, and physical and/or wireless data links for carrying data among various network elements, including combinations thereof, and can include a LAN or WAN, and an internetwork (including the internet). Wireless network 314 can be capable of carrying data, for example, to support voice, PTT, broadcast video, and data communications by a wireless device such as wireless devices 302, 304. Wireless network protocols can comprise MBMS, CDMA 1×RTT, GSM, UMTS, HSPA, EV-DO, EV-DO rev. A, 3GPP LTE, and WiMAX. Wired network protocols that may be utilized by wireless network 314 comprise Ethernet, Fast Ethernet, Gigabit Ethernet, Local Talk (such as Carrier Sense Multiple Access with Collision Avoidance), Token Ring, FDDI, ATM. Wireless network 314 can also comprise additional base stations, controller nodes, telephony switches, internet routers, network gateways, computer systems, communication links, or some other type of communication equipment, and combinations thereof.

Wireless network 314 may develop a procedure and/or protocol for meeting the power-leakage mandates. In one approach, wireless network 314 may attenuate (or reduce) UL transmit power(s) of wireless devices 302, 304 operating within a coverage area of access nodes 306, 308 and at edges of carrier bands of the RF spectrum. For example, in LTE and in the context of RF spectrum management, cross-carrier power leakage, can be controlled using a maximum power reduction (MPR) value that prescribes one or more default power levels that a wireless devices 302, 304 may use for UL transmission. In order to meet, for example, power-leakage mandates set by regulatory agencies, such as the FCC, LTE uses additional maximum power reduction (A-MPR) values used by access nodes 306, 308 to instruct wireless devices 302, 304 to further attenuate (or reduce) an UL transmit power when necessary. Typically, A-MPR values specify a power attenuation value in logarithmic units of decibels (dB) relative to their current level, where any two power levels $P_0$ and $P_1$ are related by $$x \text{ dB} = 10\log_{10}\left(\frac{P_1}{P_0}\right).$$

For example, attenuation by 3 dB corresponds to power reduction by ½ (i.e., reduction by a factor of two). An access node 306, 308 may broadcast network signaling (NS) values to wireless devices 302, 304 within its coverage area 336, 338 to indicate whether the wireless devices 302, 304 should use the default MPR value and/or apply the A-MPR value. The NS values can be used to define the cross-carrier power leakage levels that the wireless devices 302, 304 must meet and to define A-MPR values to apply in order to meet the required cross-carrier power leakage levels (or power-leakage mandates). Specifically, LTE uses "NS_01" to signify default MPR for all carrier bands and bandwidths and uses "NS_04" to signify specific attenuation values of A-MPR for, for example, the band channel 136 illustrated in FIG. 1C, which spans frequencies 2,496 MHz to 2,690 MHz. However, the actual amount of attenuation (or reduction) applied (in dB) by a wireless devices 302, 304 that receives NS_04 attenuation instructions is determined by the wireless device 302, 304 based on which UL air interface resource the wireless device 302, 304 has been allocated for upcoming transmissions by the access node 306, 308.

Figure 4:
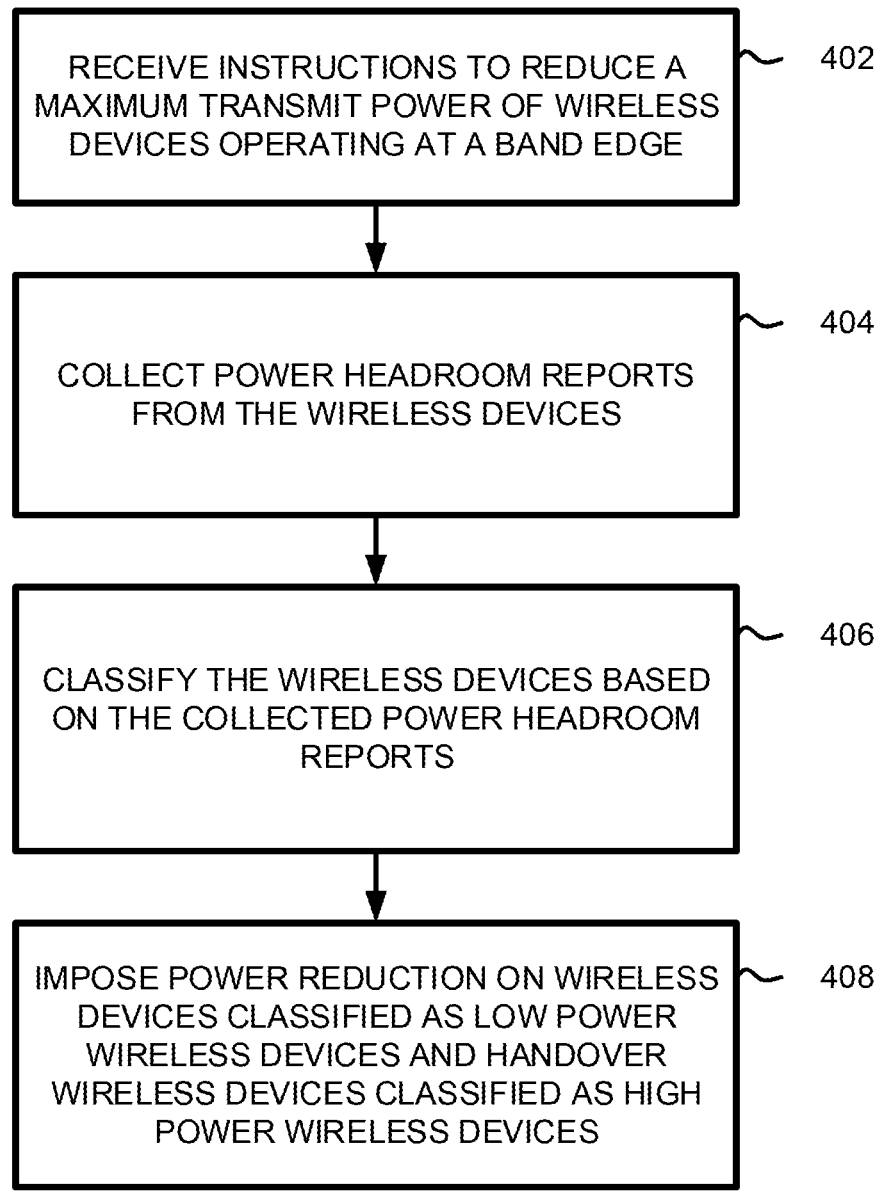
FIG. 4 illustrates an exemplary method for selecting wireless devices for handover between access nodes and/or band channels of a wireless network.

FIG. 4 illustrates another exemplary method for selecting wireless devices for handover between band channels (or access nodes) of a wireless communication network. The method of FIG. 4 will be discussed with reference to the exemplary system 300 illustrated in FIG. 3, the exemplary power class range(s) of co-deployed high power wireless devices and low power wireless devices illustrated in FIG. 1B, and the exemplary carrier bands of the band channel illustrated in FIG. 1C. But, the exemplary method for selecting wireless devices for handover illustrated in FIG. 4 can be implemented with any suitable communication system. In addition, although FIG. 4 depicts steps performed in a particular order or arrangement. One skilled in the art, using the disclosure provided herein, will appreciate that various steps of the method can be omitted, rearranged, combined, and/or adapted in various ways.

Wireless devices 302, 304 can be configured as high power wireless devices or low power wireless devices. Wireless devices 302, 304 can use PHR and/or ePHR messages to report a current transmit power state or power headroom at access nodes 306, 308; PHR and/or ePHR reporting at access nodes 306, 308 can be periodic and/or event-triggered.

Referring to FIG. 4, at 402, access node(s) 306, 308 receive instructions to reduce a maximum UL transmit power for connected wireless devices 302, 304. For example, wireless network 314 may send an NS_04 attenuation flag to access node 306 instructing access node 306 to inform wireless devices 302, 304 that they are located within (or have moved into) a coverage area 336 of an access node 306 enforcing an UL transmit power attenuation (or reduction) protocol. Access node 306 may force attenuation (or reduction) of an UL transmit power of the wireless devices 302, 304 (e.g., regardless of a power class of the wireless device) and/or trigger the wireless devices 302, 304 to perform a neighbor RSRP measurement search.

At 404, wireless devices 302, 304 can use periodic and/or event-triggered PHR and/or ePHR messaging to report a current transmit power state or power headroom at access node(s) 306, 308. The current transmit power state or power headroom can be calculated as follows:

$$PH_i = P_{cMAX} - \{10 \log_{10}(M_{PUSCH}(i)) + P_{o\_PUSCH}(j) + \alpha(j) \cdot PL + \Delta_{TF}(i) + f(i)\}[\text{dBm}],$$

where $P_{cmax}$ is the maximum allowable transmit power of wireless device 302, 304, $M_{PUSCH}(i)$ is the number of wireless resources (e.g., the next available physical resource block, wireless spectrum, etc.) allocated to wireless device 302, 304, $P_{o\_PUSCH}(I)$ is a target received power, $\alpha(j)$ is a pathloss compensation factor, and PL is a calculated pathloss between wireless device 302, 304 and access node 306, 308. $\Delta_{TF}(i)$ and f(i) are parameters used to calculate an offset associated with a transport format and a power control adjustment, respectively.

At 406, based on the current transmit power state or power headroom reported at access node(s) 306, 308 (e.g., using PHR and/or ePHR messaging), access node 306 can classify (or group) wireless devices 306, 308 as high power wireless devices or low power wireless devices. For example, those wireless devices 302 reporting a greater current transmit power state or power headroom than other wireless devices 304 operating within the coverage area 336 of the access node 306 may be classified (or grouped) as high power wireless devices (e.g., power class 1 or power class 2 wireless devices, illustrated in Table 1). In one embodiment, wireless device 302 may report an UL transmit power of +26 dBm and wireless device 304 may report an UL transmit power of +21 dBm (e.g., power class 3 or 4 wireless device, illustrated in Table 1). Based on the reported UL transmit power, access node 306 may classify (or group) wireless device 302 as a high power wireless device and wireless device 304 as a low power wireless device (e.g., off-the-shelf and/or other legacy wireless device already compliant with power-leakage mandates).

At 408, access node 306 instructs wireless devices classified (or grouped) as high power wireless devices to measure an RSRP (or other signal quality measurement) for neighboring access nodes and/or channel bands without set requirements that specify allowable levels of power leakage (i.e., power-leakage mandates). For wireless devices classified (or grouped) as high power wireless devices 302 reporting a current UL transmit power state or power headroom at access node 306 above the power-leakage mandate level (e.g., +21 dBm), access node 306 compares the reported RSRP measurement(s) for neighboring access node(s) 308 and/or channel bands to a threshold. Access node 306 may perform handover of the high power wireless device 302 when the reported RSRP measurement is above the threshold and the neighboring access node(s) 308 and/or channel bands do not have set requirements that specify allowable levels of power leakage For example, a high power wireless device 302 currently connected to NS_04 attenuation access node 306 with an attenuated (or reduced) UL transmit power of +21 dBm may be sent (or handed off) to access node 308 if the RSRP (or other signal quality measurement) of the neighboring access node 308 (or band channel) exceeds a pre-defined RSRP threshold. Once the high power wireless device 302 has been "handed off" to neighboring access node 308 (or band channel such as an FDD carrier band), the high power wireless device 302 may increase its UL transmit power to +26 dBm, which will increase the UL throughput for the wireless device 302. In a similar fashion, for example, a low power wireless device 304 handling, for example, a gigabit rate (GBR) operation such as voice over LTE (VoLTE) can also be "handed off" to a neighboring access node 308 and/or carrier band.

Figure 5:
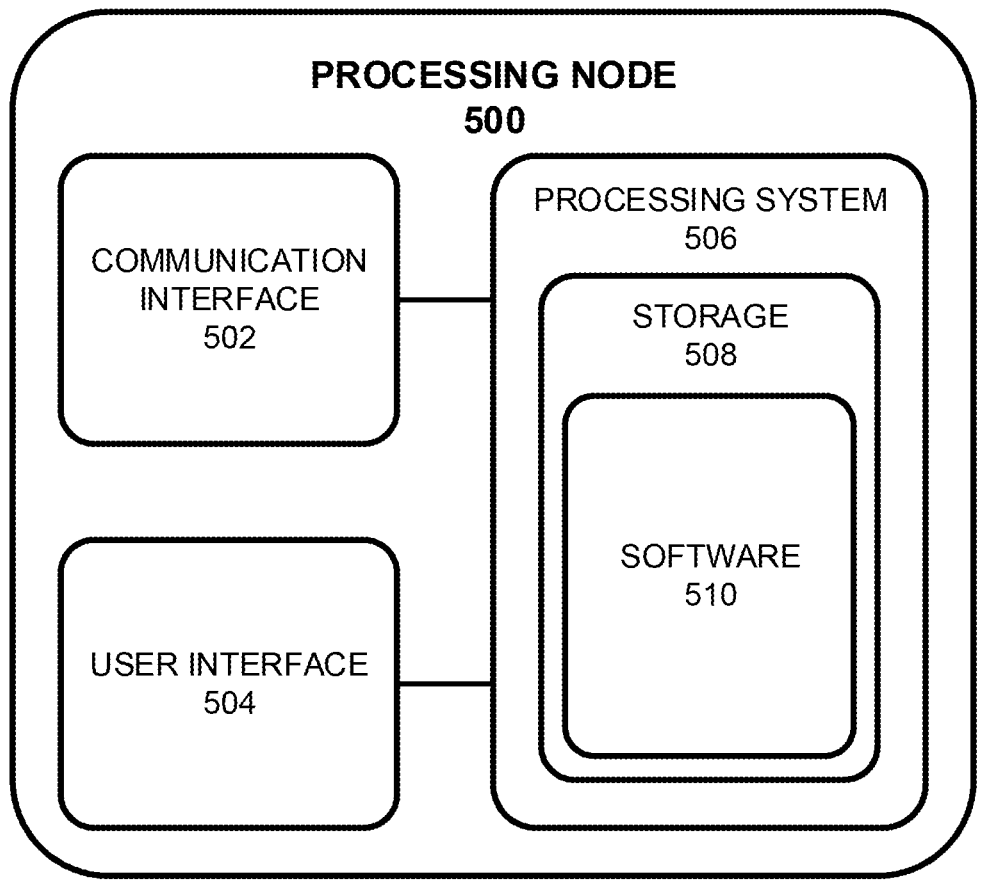
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access nodes 106, 106A, 106B, network node 110, gateway node 310, and controller node 312. Processing node 500 can also be an adjunct or component of a network element, such as an element of access nodes 106, 106A, 106B, network node 110, gateway node 310, and controller nodes 312. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for selecting a wireless device for handover, the method comprising:
   receiving a power reduction indicator at a first access node from a wireless network, the power reduction indicator designated for wireless devices operating on a first channel at the first access node, the wireless devices comprising one or more high power classified wireless devices;
   selecting one or more of the high power classified wireless devices for handover to a second channel based on a criteria, and the selection criteria comprises at least one of a current transmit power state, a power class, and a signal strength indicator of the second channel reported by the one or more high power classified wireless devices;
   handing over the selected one or more high power classified wireless devices to the second channel; and
   reducing a maximum allowable power for the unselected high power classified wireless devices.

2. The method of claim 1, wherein the power reduction indicator is an attenuation flag.

3. The method of claim 1, further comprising:
   detecting, at a carrier band edge of the first channel, cross-carrier power leakage greater than a threshold.

4. The method of claim 3, further comprising:
   instructing, by the first access node, wireless devices operating on the first channel to report a current transmit power state at the first access node; and
   classifying, at the first access node, each of the wireless devices as either a high power classified wireless device or a low power classified wireless device.

5. The method of claim 1, further comprising reducing the maximum allowable power of the selected one or more high power classified wireless devices before handover.

6. The method of claim 5, further comprising increasing the maximum allowable power of the selected one or more high power classified wireless devices after handover.

7. The method of claim 1, wherein the first access node has not received a power reduction indicator designated for wireless devices operating on a second channel.

8. The method of claim 1, wherein the power reduction indicator is a NS_04 attenuation flag.

9. The method of claim 1, wherein the second channel is a frequency division duplex (FDD) channel.

10. The method of claim 1, further comprising instructing the selected one or more high power wireless devices to search for the second channel, wherein the second channel has a RSRP that exceeds a pre-defined RSRP threshold.

11. The method of claim 1, wherein the selection criteria comprises at least two of the current transmit power state, the power class, and the signal strength indicator of the second channel reported by the one or more high power classified wireless devices.

12. The method of claim 1, wherein the selection criteria comprises the current transmit power state, the power class, and the signal strength indicator of the second channel reported by the one or more high power classified wireless devices.

13. A method for reducing an operating power of a wireless device,
    the method comprising:
    determining, at an access node, a power class category of a first wireless device and a power class category of a second wireless device, wherein the first and second wireless devices are determined to be high power classified wireless devices;
    determining that the first wireless device is operating at an edge of a first channel of the access node;
    performing a handover of the first wireless device to a neighboring channel; and
    reducing an operating power of the second wireless device.

14. The method of claim 13, wherein the power class of the first wireless device and the power class of the second wireless device is determined based on a current power headroom reported at the access node.

15. The method of claim 14, wherein the power headroom reports are periodic and/or event-triggered.

16. The method of claim 13, further comprising reducing the maximum allowable power of the first wireless device before handover.

17. The method of claim 16, further comprising increasing the maximum allowable power of the first wireless device after handover.

18. The method of claim 13, wherein the neighboring channel is a frequency division duplex (FDD) channel.

19. The method of claim 13, further comprising instructing the first wireless device to search for the neighboring channel, wherein the neighboring channel has a RSRP that exceeds a pre-defined RSRP threshold.

20. The method of claim 13, further comprising instructing the first wireless device to search for the neighboring channel, wherein the neighboring channel does not have a set requirement that specifies an allowable level of power leakage.

* * * * *